United States Patent
Haake et al.

(10) Patent No.: US 6,241,958 B1
(45) Date of Patent: Jun. 5, 2001

(54) PROCESS FOR PREPARING SULFATE-CONTAINING BASIC SOLUTIONS OF POLYALUMINUMCHLORIDE

(75) Inventors: Gerhard Haake; Gunter Geiler; Frank Haupt, all of Freiberg (DE)

(73) Assignee: Metallgesellschaft Aktiengesellschaft, Frankfurt (DE)

( * ) Notice: Subject to any disclaimer, the term of this patent is extended or adjusted under 35 U.S.C. 154(b) by 0 days.

(21) Appl. No.: 08/107,656

(22) PCT Filed: Jun. 24, 1992

(86) PCT No.: PCT/EP92/01417

§ 371 Date: Aug. 12, 1993

§ 102(e) Date: Aug. 12, 1993

(87) PCT Pub. No.: WO93/00295

PCT Pub. Date: Jan. 7, 1993

(30) Foreign Application Priority Data

Jun. 27, 1991 (DE) .................................................. 41 21 276

(51) Int. Cl.[7] .................................................. C01B 17/45
(52) U.S. Cl. .................................................. 423/467
(58) Field of Search ..................... 423/467, 495; 106/401

(56) References Cited

U.S. PATENT DOCUMENTS 2,369,691 * 2/1945 Schmerling .......................... 423/467
4,264,569 * 4/1981 Sinha .................................. 423/495
4,560,541 * 12/1985 Davis .................................. 423/495

FOREIGN PATENT DOCUMENTS

| 1907359 | * | 8/1970 | (DE) . |
| 211543 | * | 7/1984 | (DE) . |
| 2547695 | * | 12/1984 | (DE) . |
| 2289447 | * | 5/1976 | (FR) . |
| 1347413 | * | 2/1974 | (GB) . |
| 53506 | * | 3/1968 | (LU) . |

* cited by examiner

*Primary Examiner*—Steven P. Griffin
*Assistant Examiner*—Stuart L. Hendrickson
(74) *Attorney, Agent, or Firm*—Michael J. Striker

(57) ABSTRACT

The process of preparing a solution of basic sulfate-containing polyaluminum chloride includes digesting an aluminum-containing substance with hydrochloric acid to form a resulting solution and an insoluble residue; filtering the resulting solution to separate the insoluble residue therefrom and to form a solids-free solution; concentrating the solids-free solution by evaporation to form a concentrated solution having an $AlCl_3$ content of about 30 percent by weight; recovering $AlCl_3 \cdot 6\,H_2O$ from the concentrated solution by crystallization; thermally decomposing the recovered $AlCl_3 \cdot 6\,H_2O$ by heating at 150 to 200° C. so as to form a solid basic aluminum chloride containing Al and OH in a molar ratio of OH/Al of 1.35:1 to 2.25:1; dissolving the solid basic aluminum chloride in an aqueous sulfuric acid solution and heat-treating at 40 ° C. to 70 ° C. for 1 to 3 hours to form a solution of basic sulfate-containing polyaluminum chloride having a sulfate content of 1 to 6 percent by weight, an aluminum concentration of 3 to 10 percent by weight and a molar ratio of OH/Al in the solution of the basic sulfate-containing polyaluminum chloride from 1.05:1 to 1.95:1.

10 Claims, No Drawings

PROCESS FOR PREPARING SULFATE-CONTAINING BASIC SOLUTIONS OF POLYALUMINUMCHLORIDE

DESCRIPTION

This invention relates to a process of preparing sulfate-containing basic solutions of polyaluminumchloride. Such solutions are used as floc- culating agents to the neutral aluminum salts, which have been used for that purpose for a long time. Basic aluminum chlorides effect a flocculation and precipitation of the pollutants contained in the water within a relatively wide pH range and the resulting flocs are so large that they can easily be removed. The flocculation can be improved further by the incorporation of polyvalent ions, preferably sulfate ions, in the basic aluminum chloride because sulfate-containing basic aluminum chlorides will effect a faster hydrolysis than basic aluminum chlorides which are free of sulfates.

German Patent Publication 1,907,359 and German Patent Specification 2,547,695 disclose processes of preparing sulfate-containing basic solutions of aluminum chlorides. In said processes, sulfate ions are added to basic solutions of aluminum chloride. In accordance with German Patent Publication 1,907,359 the basicity of the solutions is adjusted by an addition of calcium compounds and barium compounds. A disadvantage of the known processes resides in that the sulfate ions are precipitated in part as $CaSO_4$ or $BAO_4$ and that said difficultly soluble compounds must be removed as by-products, which cannot be re-used. Besides, the solutions prepared by the known processes tend to be unstable so that difficultly aluminum compounds are undesirably precipitated or salted out and the flocculation activity is thus strongly decreased.

It is an object of the invention to provide for preparing sulfate-containing basic solutions of polyaluminumchloride a process by which products are produced which have a high flocculating activity and high stability whereas a formation of waste products is avoided. Besides, the basicity of the solutions should be adjustable within wide limits without an occurrence of instability.

The object underlying the invention is accomplished in that aluminum-containing substances are digested by a treatment with hydrochloric acid, the insoluble residue is filtered from the resulting solution, the solids-free solution is subsequently concentrated by evaporation, $AlCl_3.6H_2O$ is recovered from the concentrated solution by crystallization, the $AlCl_3.6H_2O$ is converted to a solid basic aluminum chloride by a thermal decomposition at 150 to 200° C., the solid basic aluminum chloride is charged into aqueous sulfuric acid and is dissolved therein with formation of $Al(OH)_xCl_y(SO_4)_z$ and the basic solution of aluminum chloride is subsequently heat-treated at 40 to 70° C. for 1 to 3 hours.

The aluminum-containing substance which is used may consist, e.g., of alumina hydrate and the hydrochloric acid used as a digestant contains 15 to 35% HCl. The $AlCl_3.6H_2O$ can be recovered by a crystallization in one or more stages and it is necessary to produce a crystallizate which has an optimum particle size for the subsequent thermal decomposition and a low residual moisture content. A centrifuge is desirably employed to separate the crystallizate from the mother liquor, which is recycled to the crystallizing process. The basic aluminum chloride which has been produced by the thermal decomposition is required to have a high solubility and an optimum basicity (mole ratio of OH to Al). The HCl-containing gases which have been liberated by the thermal decomposition are reacted to form aqueous hydrochloric acid, which is re-used to digest the aluminum-containing substance. The $Al(OH)_xCl_y(SO_4)_z$ formed as the basic aluminum chloride dissolved in aqueous sulfuric acid is present not only as monomers but also as oligomers but the desired degree of polymerization is not achieved until the heat treatment.

The invention affords the advantage that raw materials are used which consist of aluminum-containing substances which have previously been discarded as waste material or had to be utilized with only a low technological and economic benefit. Besides, the process in accordance with the invention is an almost self-contained process, in which substantially no by-products and/or waste products are formed. Specifically, the hydrochloric acid used to digest the raw materials is recovered in part during the thermal decomposition of the $AlCl_3.6H_2O$ and the hydrochloric acid is desirably recycled. Besides the required basicity is adjusted without a need for chemicals which would have to be disposed of as waste products. Finally, the solutions prepared by the process in accordance with the invention have extremely good properties in use. This is particularly due to the production of a solid basic intermediate product, the charging of the basic intermediate product into aqueous sulfuric acid, and the heat treatment of the solution of aluminum chloride sulfate.

According to the invention, aluminum-containing waste products are used as an aluminum-containing substance. For instance, waste solutions may be used, which are formed in the chemical industry, e.g., by the etching of aluminum or in organic syntheses catalyzed by $AlCl_3$. It is also contemplated according to the invention that the solids-free solution produced by the digestion is concentrated by evaporation to an $AlCl_3$ content of about 30 weight percent and an optimum crystallization of $AlCl_3.6H_2O$ is subsequently effected. In accordance with the invention it is particularly desirable to form an $AlCl_3.6H_2O$ having a median particle diameter $d_{50}$ between 250 and 450 micrometers and a residual moisture content of 3 to 10 weight percent. It will also be particularly desirable in accordance with the invention to form a solid basic aluminum chloride which has a basicity—i.e., a mole ratio of OH to Al— of 1.35:1 to 2.25:1. In that case the basic aluminum chloride will have a high solubility because 92 to 98 weight percent of that product are soluble in water or in aqueous sulfuric acid. It is contemplated according to the invention that the basic aluminum chloride is dissolved in water before it is added to the aqueous sulfuric acid. A particularly good dissolving behavior will be achieved if, in accordance with the invention, the solid basic aluminum chloride is dissolved in aqueous sulfuric acid or in water at 40 to 70° C. It is also contemplated according to the invention that the basic solution of aluminum chloride sulfate has an aluminum concentration of 3 to 10 weight percent, preferably 5 to 7.5 weight percent. The solutions prepared by the process in accordance with the invention will have particularly desirable properties if the basic solution of aluminum chloride sulfate has after the heat treatment a basicity (OH:Al mole ratio) of 1.05:1 to 1.95:1 and a sulfate content of 1 to 6 weight percent, preferably 2 to 4 weight percent. The properties of the solid basic aluminum chloride will be particularly constant and good if the $AlCl_3.6H_2O$ is thermally decomposed in a fluidized bed and it is desirable to form $AlCl_3.6H_2O$ crystals having a particle size of 250 to 450 micrometers. Finally, it will be necessary in some cases to filter the basic solution of aluminum chloride sulfate after the heat treatment in order to remove any solids which may be present and which can be recycled in the process as raw materials.

The subject matter of the invention will now be explained in detail with reference to examples.

EXAMPLE 1

Alumina hydrate was digested with hydrochloric acid to form a solution of aluminum chloride. When the insoluble residue had been filtered from that solution, the latter was concentrated by evaporation to an $AlCl_3$ content of 30 weight percent and was subsequently supplied at a rate of 500 kg/h to a suspension-circulating crystallizer, from which a suspension of crystals was withdrawn, which was supplied to a centrifuge, which delivered a crystallizate that consisted of $AlCl_3.6H_2O$ and had a residual moisture content of about 6 weight percent. That material was subsequently decomposed at 170 to 180° C. in a fluidized bed reactor until a basicity (OH:Al mole ratio) of 1.8:1 had been reached. The product withdrawn from the fluidized bed reactor contained 3.9 weight percent $H_2O$ and had a median particle diameter $d_{50}$ of 360 micrometers. 87% of the material had a particle diameter in the range from 200 to 500 micrometers. The solid basic aluminum chloride had an excellent solubility because 99.8 weight percent of one part by weight of the solid could be dissolved in 25 parts by weight water at about 100° C. within 10 minutes.

6 kg of the solid basic aluminum chloride were added to and dissolved in aqueous sulfuric acid at 60° C. The resulting basic solution of aluminum chloride sulfate was composed of 5.5 weight percent $Al^{3+}$, 8.7 weight percent $Cl^-$, 2.9 weight percent $SO_4^{2-}$, balance water. The solution was then heat-treated at 60° C. with stirring for 2 hours and after the heat treatment the solution had a basicity (OH:Al mole ratio) of about 1.5:1. An insoluble residue amounting to 0.5 weight percent of the solid basic aluminum chloride was filtered from the sulfate-containing solution of polyaluminumchloride.

The sulfate-containing basic solution of polyaluminumchloride which had been prepared had a very good stability because it had a turbidity of 1.4 TU/F after one day and of 3.7 TU/F after 30 days (TU/F=turbidity units related to formazine in accordance with DIN 38404 C2).

EXAMPLE 2

A sulfate-containing basic solution of polyaluminumchloride was prepared under the process conditions stated in Example 1, with the difference that a solid basic aluminum chloride having a basicity (OH:Al mole ratio) of 2.16:1 was formed as an intermediate product in the fluidized bed. In portions of 6 kg, that solid basic aluminum chloride was dissolved in different amounts of an aqueous sulfuric acid. The following sulfate-containing basic solutions of polyaluminumchloride were formed by a heat treatment at 60° C. for two hours:

Solution 2a: 7.2 weight percent $Al^{3+}$, 9.9 weight percent $Cl^-$, 3.9 weight percent $SO_4^{2-}$, basicity (OH:Al mole ratio) 1.65:1.

Solution 2b: 6.0 weight percent $Al^{3+}$, 7.1 weight percent $Cl^-$, 3.3 weight percent $SO_4^{2-}$, basicity (OH:Al mole ratio) 1.8:1.

The two sulfate-containing basic solutions of polyaluminumchloride had a very good stability.

EXAMPLE 3

Dilute solutions were prepared from the sulfate-containing basic solutions 1, 2a and 2b of polyaluminumchloride which had been prepared in Examples 1 and 2 by the process in accordance with the invention. To that end, 1 part of solution was mixed with 10 parts of water. The resulting dilute solutions 1, 2a, and 2b were tested by the so-called Jahr test for their flocculating properties. In the Jahr test, 1 ml of a suspension of 5% activated carbon are added to 800 ml water. Thereafter the flocculation consisting in the present case of the dilute solution 1, 2a, or 2b is added in an amount containing 5 mg $Al_2O_3$ as an active flocculant to the activated carbon-containing water with stirring at a speed in excess of 120 revolutions per minute. Thereafter the mixture is stirred at 40 revolutions per minute for 10 minutes. The flocs subsequently settle during a certain settling time and the suspended activated carbon is entrained and flocculated. The most important flocculating properties of the dilute solutions 1, 2a, and 2b are stated in the following table, from which it is apparent that a very good residual turbidity can be reached within a short time. Besides, no changes were exhibited even after 100 days by the solutions used to prepare the dilute solutions 2a and 2b.

TABLE 1

| | Dilute Solutions | | |
|---|---|---|---|
| | 1 | 2a | 2b |
| Floc size (mm) | 2.5 | 3 | 4 |
| Settling time (minutes) | <3 | <2 | <1.5 |
| Residual turbidity (TU/F) | 0.14 | 0.20 | 0.15 |

It has finally been found that sulfate-containing basic solutions of polyaluminumchloride having much poorer properties than the products of the process in accordance with the invention will be obtained if the step of dissolving the solid basic aluminum chloride is altered in that sulfuric acid is charged into an aqueous solution of the basic aluminum chloride and a heat treatment at 60° C. is subsequently effected for two hours. If in a deviation from the invention Example 1 is carried out in such a manner that the aqueous sulfuric acid is charged into an aqueous solution of the basic aluminum chloride, a sulfate-containing basic solution of polyaluminumchloride will be obtained, which when diluted at a ratio of 1:10 has the following poorer flocculating properties in the Jahr test:

Floc size 0.3 mm
Settling time >10 minutes
Residual turbidity 0.22 TU/F

What is claimed is:

1. A process of preparing a solution of basic sulfate-containing polyaluminum chloride, said process comprising the steps of:
   a. digesting an aluminum-containing substance with hydrochloric acid to form a resulting solution and an insoluble residue;
   b. filtering said resulting solution formed in step a) to separate said insoluble residue therefrom and to form a solids-free solution;
   c. concentrating said solids-free solution formed in step b) by evaporation to form a concentrated solution having an $AlCl_3$ content of about 30 percent by weight;
   d. recovering $AlCl_3.6H_2O$ from said concentrated solution formed in step c) by crystallization;
   e. thermally decomposing said $AlCl_3.6H_2O$ formed in step d) to form a solid basic aluminum chloride by heating at temperatures from 150 to 200° C. so that said solid basic aluminum chloride contains Al and OH in a molar ratio of OH/Al of from 1.35:1 to 2.25:1;
   f. feeding the solid basic aluminum chloride formed in step e) into an aqueous sulfuric acid solution and dissolving said solid basic aluminum chloride therein to form another solution; and g. subsequently to step f), heat-treating said another solution at temperatures of 40° C. to 70° C. for 1 to 3 hours to form a solution of basic sulfate-containing polyaluminum chloride having a sulfate content of 1 to 6 percent by weight and an aluminum concentration of 3 to 10 percent by weight, wherein said molar ratio of OH/Al in said solution of said basic sulfate-containing polyaluminum chloride is from 1.05:1 to 1.95:1.

2. The process according to claim 1, wherein said aluminum-containing substance comprises an aluminum-containing waste product.

3. The process according to claim 1, wherein said $AlCl_3.6H_2O$ consists of a plurality of aluminum chloride-containing particles having a mean particle diameter ($d_{50}$) between 250 and 450 micrometers.

4. The process according to claim 1, wherein said dissolving of said solid basic aluminum chloride in said aqueous sulfuric acid takes place at 40 to 70° C.

5. The process according to claim 1, wherein said aluminum concentration of said solution of said basic sulfate-containing polyaluminum chloride is 5 to 7.5 percent by weight.

6. The process according to claim 1, wherein said sulfate content of said solution of said basic sulfate-containing polyaluminum chloride is 2 to 4 percent by weight.

7. The process according to claim 1, wherein said thermally decomposing of said $AlCl_3.6H_2O$ occurs in a fluidized bed.

8. The process according to claim 1, further comprising after said heat-treating, filtering said solution of said basic sulfate-containing polyaluminum chloride.

9. The process according to claim 1, further comprising dissolving said solid basic aluminum chloride in water prior to said feeding into said aqueous sulfuric acid.

10. The process according to claim 9, wherein said dissolving of said solid basic aluminum chloride in said water takes place at 40 to 70° C.

* * * * *